Feb. 20, 1934.  O. STANGELAND  1,948,082

FREE WHEEL AND BACK STOP DEVICE

Filed Sept. 21, 1931  2 Sheets-Sheet 1

INVENTOR.
OLE STANGELAND.
BY George E. Mueller
ATTORNEY.

Feb. 20, 1934.     O. STANGELAND     1,948,082
FREE WHEEL AND BACK STOP DEVICE
Filed Sept. 21, 1931     2 Sheets-Sheet 2
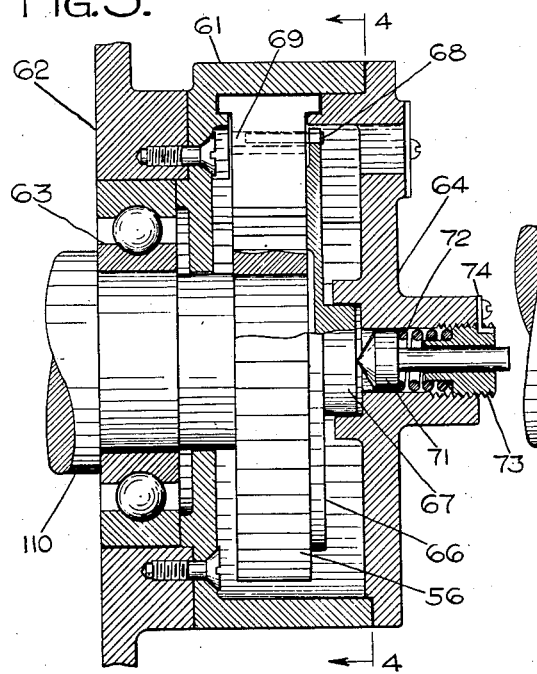
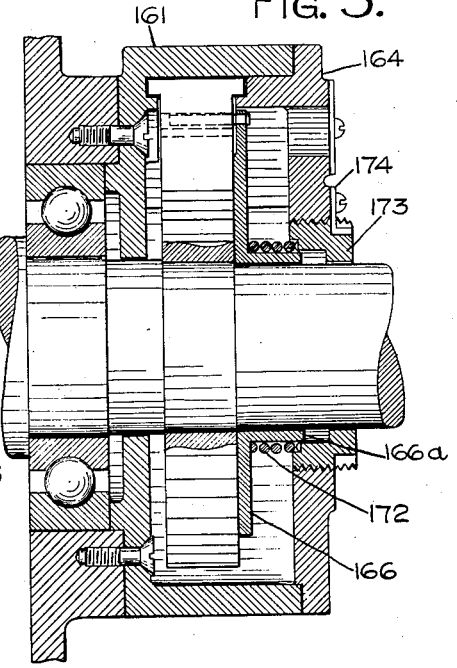
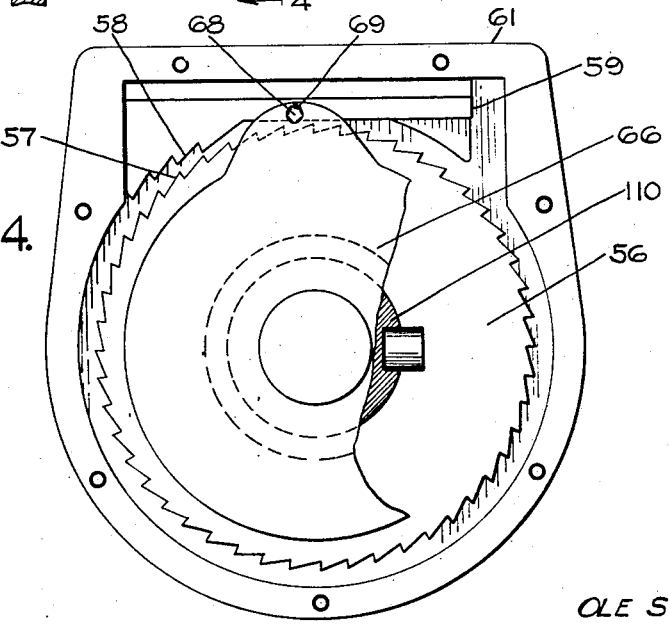
INVENTOR.
OLE STANGELAND
BY George E. Mueller
ATTORNEY.

Patented Feb. 20, 1934

1,948,082

UNITED STATES PATENT OFFICE 1,948,082

FREE WHEEL AND BACK STOP DEVICE

Ole Stangeland, Chicago, Ill.

Application September 21, 1931
Serial No. 563,993

11 Claims. (Cl. 192—13)

My invention relates in general to the control of internal combustion engines and automobiles driven by internal combustion engines.

It relates more particular to a novel combination free wheel and back stop device.

Heretofore the matter of providing free wheeling for automobiles, the preventing of turning the motor backwards due to back fire, and preventing the backing of an automobile when starting up hill from a starting position, have been considered separate problems requiring entirely different developments and entirely unrelated equipment.

The principal object of my present invention is to provide for all of these features in a substantially unitary device.

Another object is the provision of such a device in which the free wheel feature, operated by means of a uni-directional clutch, may be locked out so as in effect to produce a bi-directional clutch.

Another object is to provide a simple means for preventing an internal combustion engine from turning backwards due to back fire.

Another object is the provision of an improved clutch construction which may be employed for a free wheeling system, or a reverse drive brake, substantially without change.

Another object is the provision of a device of the character described which occupies a small amount of space, is economical to manufacture and has a long life.

Other objects and features of the invention will be apparent from a consideration of the following detailed description taken with the accompanying drawings, wherein Fig. 1 is an elevational view, partly in section, showing one embodiment which my invention may take, including a free wheeling unit and means for preventing both an automobile and motor from moving in a direction opposite to that intended;

Fig. 3 is a sectional view showing a back stop device employed without the free wheeling;

Fig. 4 is a view with the housing cover removed, looking in the direction of the arrows along the line 4—4 of Fig. 3; and Fig. 5 is a modified form of the device shown in Fig. 3.

Figure 1:
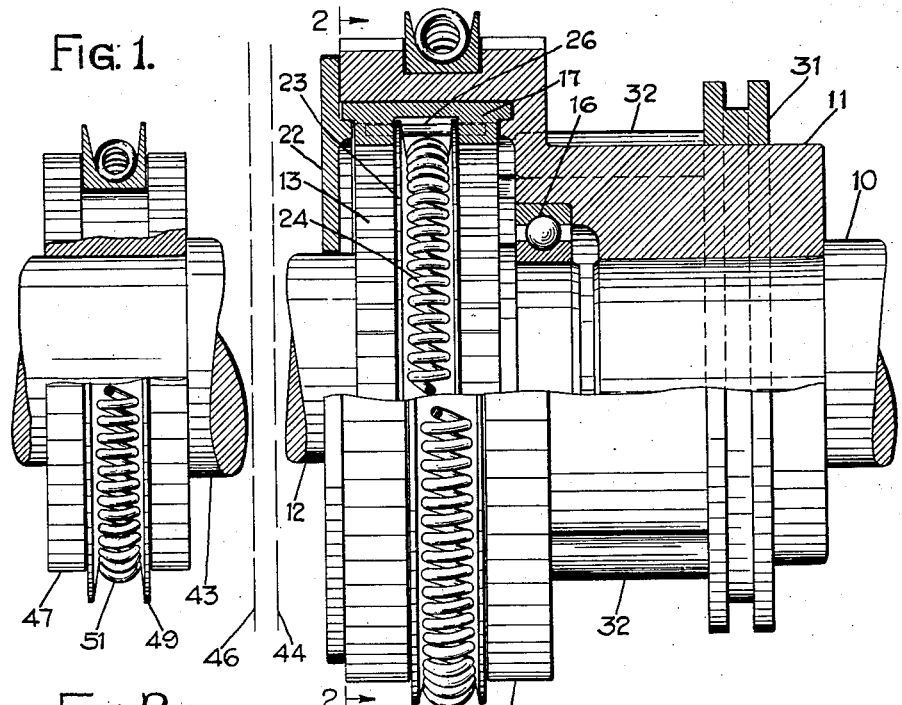
Figure 2:
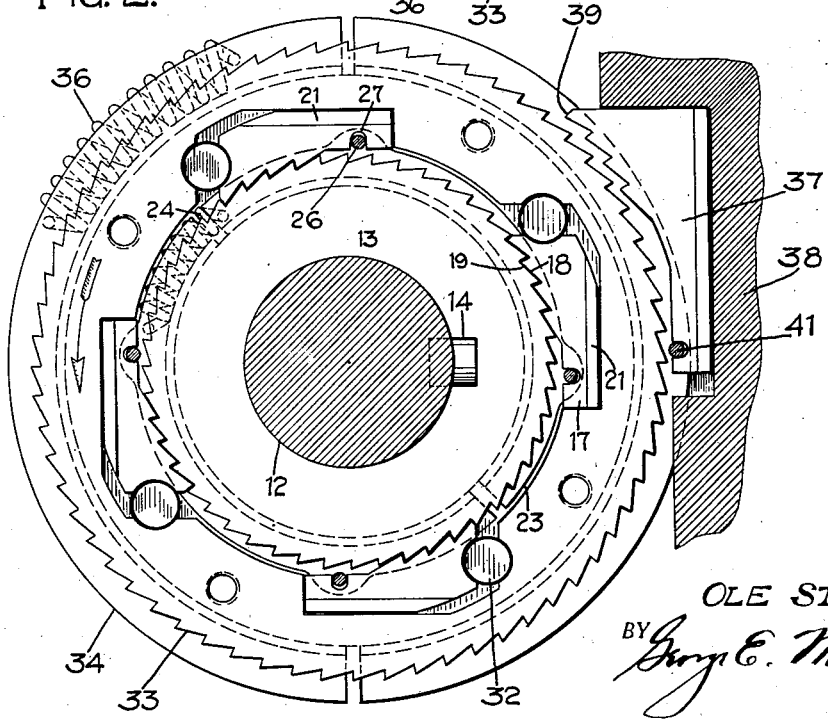
Fig. 2 is a sectional view taken along the line 2—2 of Fig. 1.

Referring now first to Figs. 1 and 2, I show a shaft 10 which may be the engine drive shaft to which is secured a driving housing 11, it being understood, of course, that the housing 11 may form a part of the shaft or it may be secured to the shaft in any suitable way, such as by means of a key. A driven shaft 12 has a hub 13 secured thereto by a key 14. Between the housing 11 and the hub 13, I provide unidirectional clutch means which permits free wheeling between these parts in a manner to be described. Shaft 12 is in alignment with shaft 10 and both shafts carry suitable bearings. In order to be certain, however, that the two shafts are in alignment, I provide a ball bearing 16 between the shaft 12 and the housing 11.

Now, as to the unidirectional clutch means which provides for free wheeling between shafts 10 and 12, I provide a plurality of sliding drive pawls 17 having teeth 18 adapted to engage teeth 19 carried by the hub 13.

These sliding drive pawls have side flanges 21 which engage in slots at the sides thereof, one slot being formed in the housing 11 and the other slot formed between a projection carried by a housing cover 22 and the adjacent portion of the housing. These sliding drive pawls are adapted to move tangentially of the hub so as either to engage the hub or disengage the hub as controlled in a manner to be described hereinafter. Assume the direction of rotation of the housing 11 to be as indicated by the arrow in Fig. 2. It is clear, then, that when the sliding pawls 21 have to move against the stop provided in the housing in a clockwise direction, there is substantially an integral connection between the housing and hub and heavy loads can be applied without possibility of serious injury or wear to the driving pawls. When the driving pawls are moved in the opposite direction, it is obvious that the teeth become disengaged and the hub is free to move without driving the housing.

In controlling the position of the sliding drive pawls, I provide a bi-part friction control plate 23, which is held frictionally against the hub 13 by a coil spring 24, which is disposed in an outer peripheral groove in the friction control plate 23. This control plate has offset projections carrying pins 26, and these pins engage in edge slots 27 in the pawls 17. Relative movement between the housing and friction control plate 23 will have the effect of moving the sliding pawls 17 in a direction to either engage or disengage the teeth, as the case may be. Assume that the housing is driving the hub and the parts are in position indicated in Fig. 2. At this time, if the motor is slowed down or if, for any reason, there is a tendency for the driven shaft to move faster than the driving shaft and housing, the bi-part plate

23 will move forward with respect to the housing, carrying the sliding pawl flanges 21 in a counter clockwise direction until the teeth 18 are drawn out of engagement with the teeth 19. The hub is then permitted to move on freely at a speed in excess of the speed of rotation of the housing and free wheeling results. When the relative speed of the housing is again increased, and there is a tendency for the housing to rotate faster than the hub, the sliding pawls, for the same reason, will be moved in an opposite direction, the teeth will be engaged and the hub will be driven by the driving housing.

I also provide lock-out means for locking out the unidirectional clutch. This I accomplish by holding the pawls in a position so that the teeth 18 are in mesh with the teeth 19 under all circumstances. At a suitable position on the housing, I provide an adjusting ring 31 which carries a plurality of lockout pins 32 which pins are adapted to be advanced into position between the pawls 17 and the adjacent portion of the housing. As the drawings show, both the pawls and housing are provided with oppositely disposed arcuate faces corresponding in curvature with the pins 32. These pins are forced in through the adjusting ring 31, any suitable means including a yolk for engaging the ring 31 being employed and preferably operated by a lever mechanism (not shown) from the driver's seat.

In connection with the device, I also provide means for preventing the engine from running backwards, as it has a tendency to do sometimes in backfiring. This is particularly true in high compression engines and it is, therefore, very dangerous to start these engines now by hand. With my backstop device, reverse movement is absolutely prevented. The mechanism employed is the same as that employed in driving the free wheel pawls 17, the backstopping effect being obtained by restricting the movement of the pawls, mounting them in some permanent stationary portion of the equipment, such as the motor itself.

Referring now to the drawings, I provide a plurality of teeth 33 on the periphery of the driving housing and midway between the teeth is a pawl operating bi-part ring 34, frictionally held onto the housing by a spring 36. A pawl 37 is slidably supported in a stationary portion of the equipment 38, the pawl being permitted relatively slight sliding movement, sufficient to throw its teeth 39 into or out of engagement with the teeth 33 on the exterior of the housing.

The locking pawl 37 has a surface slot into which a pin 41 carried by the member 34 is adapted to extend. From this construction, it will be seen that immediately when there is a tendency for the shaft 10 to turn backwards, the plate 34 frictionally held so as to move with the shaft 10, carries the pawl 37 downwardly (Fig. 2) until the teeth 39 engage the teeth 33. As soon as this engagement takes place, which is substantially immediately, all further backward movement of the shaft 10 is effectually arrested. I show a backstop device mounted on the driving housing, but it is obvious that it could be built any place along the shaft 10 without any connection whatsoever with the free wheel unit. The construction which I show, however, has many advantages in simplicity and the like to recommend it.

My invention also contemplates simple means for preventing an automobile from backing down a hill when, from a standing position, it is to be started on a hill. It is obvious that if an automobile is left in gear and parked on a hill, the same mechanism which would prevent the car from driving backwards would also prevent the car from rolling down hill backwards. When starting however with the clutch disengaged, the backstop device, as heretofore described, would be inoperative. I therefore employ additional means, unusually simple in character, for accomplishing my result.

Looking at Fig. 1, I show a driven shaft 43 and between shafts 43 and 12 I show schematically a driving clutch member 44 and a driven clutch member 46. The shaft 43, therefore, in the position shown, might be the main transmission drive shaft, although obviously the specific arrangement of the shafts might be modified. The shaft 43 carries the geared hub 47, and this hub 47 has a pawl adjusting plate 49 held onto the hub by a spring 51, the spring being tensioned to apply enough friction to cause the member 49 to tend to move with the hub 47. A locking pawl, identical with that shown in Fig. 2, is provided for preventing reverse movement of the shaft 43. This pawl, however, is not shown in Fig. 2 and is not shown in detail in Fig. 1. It is identical with the arrangement shown in Fig. 2.

In the use of the device, assume that an automobile is stopped on a hill, and is to be started from the hill. One foot may be held on the brake and the other foot used to depress the clutch pedal and the transmission is operated to engage the low speed gears. This operably connects the wheels with the shaft 43 and the right foot may then be released from the brake and used to operate the foot throttle for increasing the speed of rotation of the engine preparatory to starting. Starting is then accomplished in the ordinary way, just as if the automobile were standing on a level roadway.

Figures 3 and 4 show a modified arrangement of the backstop for preventing the engine from turning backwards. In the arrangement of Fig. 3, the shaft 110 is shown as a stub shaft and does not transmit motion to a driven shaft. Hub 56 is secured on shaft 110 to rotate therewith and carries teeth 57 which are adapted to be engaged by teeth 58, carried by the sliding pawl 59. This pawl is slidably supported in a housing 61, which is secured to a suitable portion of the frame work 62, which frame work may be a part of the engine, as indicated in Fig. 3, in which a bearing 63 is shown between the shaft and the frame 62. The housing has a cover 64, which serves to support one side of the pawl 59.

The pawl 59 can be shifted within the housing so as to engage or disengage the gears 57 and 58. I control the movement of the pawl by friction plate 66 mounted at the end of the shaft and having a boss 67 engaged by friction regulating means for adjusting the friction between the plate 66 and the hub 56. The plate 66 carries a pin 68 which extends into a slot 69, carried by the pawl 59, so that the pin may move the pawl 59 in either direction, as determined by the movement of the plate 66. Assume that the rotation of the shaft and of the hub 56 is in a counter-clockwise direction looking at Fig. 4. The friction between the plate 66 and the hub tends to move the plate in the same direction and the pawl 59 is held in a position to keep the teeth out of engagement, which is the position shown in Fig. 4. As soon as the shaft starts to move in a reverse direction, however, due to back-firing of the engine, for example, the plate 66 is moved in a reverse direction, thereby immediately carrying the pawl 59 with it and engaging the teeth 57 and 58, and effectually preventing any further turning of the shaft.

In Fig. 3, I show one way in which the friction between the plate and hub may be regulated. A plunger 71 has a small end bearing against the boss 67 and a compression spring 72 bearing against the plunger forces the plunger against the boss to hold the plate against the hub. An adjusting nut 73 is provided for regulating the pressure of the spring 72, and suitable like means 74 is provided for holding the nut 73 in position to which it has been turned.

In Fig. 5, I have substantially the same arrangement as shown in Fig. 3, with the exception that the shaft extends beyond the back stop device and may perform a driving function after passing through the housing 161. For simplicity of description, I employ the same reference characters in Fig. 5 as in Fig. 3, prefixed by the numeral "one". The embodiment of Fig. 5 differs from Fig. 3 principally in the modified means for applying friction to the plate 166 due to the fact that the shaft takes up the position occupied by the friction adjusting means of Fig. 3. In Fig. 5, an annular flange 166A is carried by the plate 166, this flange extending around the shaft and carrying the spring 172, a relatively large adjusting nut 173 bears directly against the spring 172 and is threaded into the cover 164. Lock means 174 is provided for fastening the large nut 173 in position to which it has been turned. In this form it will be seen that both the spring and the nut 173 are larger in diameter than the driven shaft, the shaft passing directly through them and axially thereof.

The device of my invention is adapted for use on different kinds of automobiles, but principally in connection with automobiles driven by internal combustion engines. The backstop device, however, may be used alone with very good results on high compression aviation engines, for example, which are very often started by hand and which become dangerous to start due to the possibility of back firing caused by preignition.

I have described my invention in detail in order that those skilled in the art may understand the same, but it is obvious that I do not restrict myself to the particular forms shown, the invention being limited only by the scope of the appended claims.

What I claim as new and desire to protect by Letters Patent of the United States is:—

1. In a device of the character described, a driving member, a driven member, teeth carried by the driven member, a plurality of pawls slidably carried by the driving member in a plane tangent to the teeth on the driven member, a pawl controlling member frictionally supported on the driven member and having connections with the pawls to slide them in and out of engagement with the teeth on the driven member.

2. In a device of the character described, a driving member, a driven member, teeth carried by the driven member, a plurality of pawls slidably carried by the driving member in a plane tangent to the teeth on the driven member, a pawl controlling member frictionally supported on the driven member and having connections with the pawls to slide them in and out of engagement with the teeth on the driven member, and means for controlling the friction between the pawl controlling member and the driven member.

3. In a device of the character described, a driving shaft, and driving housing carried thereby, a driven shaft, a hub on the driven shaft having peripheral driving teeth, toothed pawls tangentially slidably supported in the housing, and engaging the driving teeth on the hub when the driving shaft tends to move faster than the driven shaft, and means for sliding said pawls within said housing to disengage the driving teeth when the driven shaft tends to move more rapidly than the driving shaft.

4. In a device of the character described, a driving shaft, and driving housing carried thereby, a driven shaft, a hub on the driven shaft having peripheral driving teeth, toothed pawls slidably supported in the housing, and engaging the driving teeth on the hub when the driving shaft tends to move faster than the driven shaft, and means for sliding said pawls within said housing to disengage the driving teeth when the driven shaft tends to move more rapidly than the driving shaft, and slidable means adapted to engage one end of the pawls with a wedging action for rendering the last mentioned means ineffective whereby the two shafts are coupled to permit driving in either direction.

5. In a device of the character described, a driving shaft, a driving housing, a driven shaft, a hub on the shaft having peripheral driving teeth, driving pawls having a plurality of teeth adapted to mesh with the driving teeth on the hub, means for mounting the pawls in the housing for restricted sliding movement with respect to the housing along a line tangent to the hub, whereby, when the pawls are at one extreme of movement, the teeth are in full engagement, and at the opposite extreme of movement, are entirely out of engagement, and means carried by the housing for engaging between the ends of the pawls and the housing for holding the pawls in one extreme position.

6. In a device of the character described, a driving shaft, a driving housing, a driven shaft, a hub on the shaft having peripheral driving teeth, driving pawls having teeth adapted to mesh with the driving teeth on the hub, means for mounting the pawls in the housing for restricted sliding movement with respect to the housing along a line tangent to the hub, whereby, when the pawls are at one extreme of movement, the teeth are in full engagement, and at the opposite extreme of movement, are entirely out of engagement, a plate frictionally supported on the hub and having a connection with the pawls whereby when the driven shaft tends to rotate more rapidly than the driven shaft, said plate will slide the pawls to disengage the teeth and permit free over-running of the driven shaft.

7. In a device of the character described, a housing having a plurality of slots a ratchet gear disposed within the housing, a pawl having flanges disposed in said housing slots so as to be slidable substantially tangentially of the ratchet gear, and a plurality of teeth on said pawl positioned to engage said ratchet gear or disengage said ratchet gear depending upon the position of the pawl.

8. A device as defined in claim 7 including means frictionally supported with respect to said ratchet gear and engaging said pawl for controlling the position thereof in response to relative movement between said housing and ratchet gear.

9. A device as defined in claim 7, including a friction member disposed in a slot in said ratchet gear and engaging said pawl whereby to control the position of said pawl in response to relative movement between the housing and ratchet gear.

10. A device as defined in claim 7, wherein said ratchet gear is provided with an annular slot, and including a plural part friction member disposed in said slot, a spring engaging the plural part member to hold it frictionally in said slot, and a connection from said plural part friction member to the pawl, whereby to control the position of the pawl in response to relative movement between the housing and ratchet gear.

11. In a device of the character described, a driving housing, a ratchet gear disposed in the housing, toothed pawls slidable in the housing and controlled either to engage or disengage the said ratchet gear, ratchet teeth disposed on the outer periphery of the housing and a toothed pawl slidably supported in tangential relation to said outer teeth and controlled to remain out of engagement with the housing teeth when the housing turns in a normal direction but adapted to engage said teeth when the housing turns in a reverse direction.

OLE STANGELAND.